(12) United States Patent
Huang

(10) Patent No.: US 10,860,595 B2
(45) Date of Patent: Dec. 8, 2020

(54) USER SOCIAL-RELATIONSHIP IDENTIFICATION APPARATUS, METHOD, AND TERMINAL DEVICE

(71) Applicant: GUANGZHOU UC NETWORK TECHNOLOGY CO., LTD., Guangzhou (CN)

(72) Inventor: Zhen Huang, Guangzhou (CN)

(73) Assignee: Guangzhou UC Network Technology Co., Ltd., Guangzhou (CN)

( * ) Notice: Subject to any disclaimer, the term of this patent is extended or adjusted under 35 U.S.C. 154(b) by 282 days.

(21) Appl. No.: 15/968,381

(22) Filed: May 1, 2018

(65) Prior Publication Data

US 2018/0246940 A1  Aug. 30, 2018

Related U.S. Application Data

(63) Continuation of application No. PCT/CN2016/107008, filed on Nov. 24, 2016.

(30) Foreign Application Priority Data

Mar. 16, 2016 (CN) .......................... 2016 1 0150917

(51) Int. Cl.
*G06F 16/2458* (2019.01)
*G06Q 30/02* (2012.01)
*G06Q 50/00* (2012.01)

(52) U.S. Cl.
CPC ..... *G06F 16/2465* (2019.01); *G06Q 30/0201* (2013.01); *G06Q 50/01* (2013.01)

(58) Field of Classification Search
CPC .. G06F 13/16; G06F 13/4068; G06F 13/4265; G06F 16/9535; G06F 16/951; G06F 40/30; G06F 16/335; G06F 16/435
(Continued)

(56) References Cited

U.S. PATENT DOCUMENTS 7,206,934 B2   4/2007  Pabla et al.
8,489,701 B2   7/2013  Manion et al.
(Continued)

FOREIGN PATENT DOCUMENTS

CN   103150678 A   6/2013
CN   103164416 A   6/2013
(Continued)

OTHER PUBLICATIONS

PCT International Preliminary Report on Patentability dated Sep. 27, 2018, issued in related International Application No. PCT/CN2016/107008, with English machine translation (11 pages).
(Continued)

*Primary Examiner* — Angelica Ruiz
(74) *Attorney, Agent, or Firm* — Sheppard Mullin Richter & Hampton LLP

(57) ABSTRACT

The present invention discloses a device and a method for identifying the social relations of users and a terminal device. According to the present invention, the Wi-Fi connection information of terminal devices used by the users within a predetermined scene period is collected, a scene Wi-Fi corresponding to each terminal device in a predetermined scene is identified according to the Wi-Fi connection information, and it is determined that the users using the terminal devices corresponding to the same scene Wi-Fi have a first-level contact relation. In this way, the first-level contact relations among the users can be identified based on the collected Wi-Fi connection information of the terminal devices used by the users, thereby solving the problem that in an existing technology for identifying the social relations of the users, because of the relatively single source of social data, the social relations of the users cannot be accurately obtained in the absence of social data.

18 Claims, 10 Drawing Sheets

(58) Field of Classification Search
USPC .......... 707/600–831, 899, 999.001–999.206
See application file for complete search history.

(56) References Cited

U.S. PATENT DOCUMENTS

| | | | |
|---|---|---|---|
| 8,717,931 | B2 | 5/2014 | Taniuchi et al. |
| 8,744,976 | B2 | 6/2014 | Jagadish et al. |
| 9,368,019 | B1 | 6/2016 | Rosenberg |
| 9,501,777 | B1 | 11/2016 | Liu |
| 2003/0214955 | A1 | 11/2003 | Kim |
| 2005/0075917 | A1 | 4/2005 | Fores et al. |
| 2008/0056282 | A1 | 3/2008 | Moon |
| 2008/0261526 | A1 | 10/2008 | Suresh |
| 2009/0005005 | A1* | 1/2009 | Forstall .................. H04W 4/50 455/411 |
| 2010/0124937 | A1 | 5/2010 | Vogel et al. |
| 2010/0166002 | A1 | 7/2010 | Gan et al. |
| 2011/0029359 | A1* | 2/2011 | Roeding ............... G01S 5/0257 705/14.1 |
| 2011/0029364 | A1* | 2/2011 | Roeding .................. G01S 5/18 705/14.16 |
| 2011/0281519 | A1 | 11/2011 | Reuss et al. |
| 2012/0100868 | A1 | 4/2012 | Kim et al. |
| 2013/0241951 | A1 | 9/2013 | Dickinson et al. |
| 2013/0262483 | A1* | 10/2013 | Blom .................. G06F 16/9535 707/752 |
| 2014/0052281 | A1* | 2/2014 | Eronen .................. G06F 16/40 700/94 |
| 2014/0062657 | A1 | 3/2014 | Adachi et al. |
| 2014/0269646 | A1* | 9/2014 | Ramasamy ........... H04W 76/14 370/338 |
| 2014/0278665 | A1 | 9/2014 | Itani |
| 2015/0019553 | A1* | 1/2015 | Shaashua ............... H04W 4/70 707/737 |
| 2015/0373493 | A1* | 12/2015 | Chowdhury ...... H04M 1/72572 455/456.3 |
| 2016/0381612 | A1 | 12/2016 | Gao |
| 2017/0329866 | A1 | 11/2017 | Macpherson |

FOREIGN PATENT DOCUMENTS

| | | |
|---|---|---|
| CN | 103714135 A | 4/2014 |
| CN | 103906173 A | 7/2014 |
| CN | 104636382 A | 5/2015 |
| CN | 104717610 A | 6/2015 |
| CN | 105159926 A | 12/2015 |
| CN | 105354749 A | 2/2016 |
| CN | 105824921 A | 8/2016 |

OTHER PUBLICATIONS

First Search dated Aug. 28, 2018, issued in related Chinese Application No. 201610150917.9 (2 pages).
First Office Action dated Sep. 5, 2018, issued in related Chinese Application No. 201610150917.9, with English machine translation (18 pages).
Second Office Action dated Mar. 20, 2019, issued in related Chinese Application No. 201610150917.9, with English machine translation (20 pages).
Third Office Action dated Jul. 12, 2019, issued in related Chinese Application No. 201610150917.9, with English machine translation (20 pages).
International Search Report and Written Opinion for Application No. PCT/CN2016/107008, dated Feb. 28, 2017, 10 pages.

* cited by examiner

USER SOCIAL-RELATIONSHIP IDENTIFICATION APPARATUS, METHOD, AND TERMINAL DEVICE

CROSS-REFERENCE TO RELATED APPLICATIONS

This application is a continuation application of International Patent Application Number PCT/CN2016/107008, filed on Nov. 24, 2016, which claims the priority of Chinese Patent Application No. CN 201610150917.9, filed on Mar. 16, 2016 with State Intellectual Property Office of P.R. China, titled "User Social Relationship Identification Apparatus and Method." The entire content of the above-referenced applications is incorporated herein by reference.

TECHNICAL FIELD

The present invention relates to the technical field of social activities, in particular to a device, a method, and a terminal device for identifying the social relationships of users.

BACKGROUND ART

Social relations and second-level contacts of a user are important attributes of the user and are important complements to understanding of the user. Fully mining the social relations of users is beneficial to providing better services for regular users and good user maintenance, and also is beneficial to cross-marketing and development of new users.

In view of the importance of the social relations of the users, the social relations of the users are not only important data assets and valuable treasures of Internet social enterprises (such as Tencent, FaceBook, etc.), but also data desired by many non-Internet social enterprises (such as non-social Internet enterprises, traditional banks, government agencies, etc.).

Social relations can mostly be obtained through analyzing and processing social data. Most of the social data comes from account information (such as friend information in a user account, a mobile phone address book, etc.) of various applications registered by the users. The source of the social data is relatively singular. In the absence of the social data of the users, one cannot accurately obtain the social relations of the users.

SUMMARY

In view of this, the embodiments of the present invention disclose a novel device and method for identifying the social relations of users and a terminal device, which can use Wi-Fi connection information of the users to establish the social relations of the users so as to solve the problem that the social relations cannot be obtained due to the lack of social data of the users.

According to one aspect of the embodiments of the present invention, a device for identifying the social relations of users is disclosed. The device comprises: a Wi-Fi connection information collecting unit, configured to collect the Wi-Fi connection information of terminal devices used by the users within a predetermined scene period, wherein the predetermined scene period corresponding to a predetermined scene; a scene Wi-Fi identifying unit, configured to identify a scene Wi-Fi corresponding to each terminal device in the predetermined scene according to the Wi-Fi connection information; and a first-level contact relation determining unit, configured to determine that the users using the terminal devices corresponding to the same scene Wi-Fi have a first-level contact relation.

Therefore, the users using the terminal devices corresponding to the same scene Wi-Fi can be determined to have a first-level contact relation according to the Wi-Fi connection information of the terminal devices used by the users.

Preferably, the predetermined scene comprises a working scene and/or a home scene; the predetermined scene period comprises a working period and/or a home period; the working period is a set period in the working time of working days; and the home period is a set period of every night.

Preferably, the scene Wi-Fi identifying unit may include: a counting unit, configured to count the connection frequency of each Wi-Fi connected by the terminal device used by each user within the predetermined scene period; and a sub-identification unit, configured to identify the Wi-Fi with the highest connection frequency as the scene Wi-Fi corresponding to the terminal device in the predetermined scene.

Preferably, the sub-identification unit determines that the terminal device does not have a corresponding scene Wi-Fi in the predetermined scene if the connection frequency of the Wi-Fi with the highest connection frequency is smaller than a predetermined scene frequency threshold.

Preferably, the first-level contact relation determining unit may comprise: a relation matrix establishing unit, configured to establish a scene relation matrix $M_k$ corresponding to each predetermined scene, and if the $i^{th}$ user and the $j^{th}$ user correspond to the same scene Wi-Fi in the $k^{th}$ predetermined scene, the elements in $j^{th}$ column of the $i^{th}$ row as well as in $i^{th}$ column of the $j^{th}$ row of $M_k$ are set to be "1", otherwise "0", wherein i, j and k are natural numbers; a relation matrix fusion unit, configured to add scene relation matrices $M_k$ corresponding to all the predetermined scenes to obtain a fusion relation matrix R; and a first assignment unit, configured to assign "1" to all non-zero elements in the fusion relation matrix R to obtain a first-level contact relation matrix T, wherein if the element in $j^{th}$ column of the $i^{th}$ row is "1", it is indicated that there is a first-level contact relation between the $i^{th}$ user and the $j^{th}$ user, and if the element in $j^{th}$ column of the $i^{th}$ row is "0", it is indicated that there is no first-level contact relation between the $i^{th}$ user and the $j^{th}$ user.

Thus, the relation matrices can be used for determining the users who have a first-level contact relation.

Preferably, the device may further comprise: a squaring unit, configured to square the first-level contact relation matrix T to obtain a squaring matrix T×T; a second assignment unit configured to assign "1" to all non-zero elements in the squaring matrix to obtain a composite relation matrix U; and a subtracting unit, configured to subtract the first-level contact relation matrix T from the composite relation matrix U to obtain a second-level contact relation matrix V, wherein if the element in $j^{th}$ column of the $i^{th}$ row is "1", it is indicated that there is a second-level contact relation between the $i^{th}$ user and the $j^{th}$ user, and if the element in $j^{th}$ column of the $i^{th}$ row is "0", it is indicated that there is no second-level contact relation between the $i^{th}$ user and the $j^{th}$ user.

Thus, the second-level contact relation among users can be further mined according to the characteristics of matrix squaring.

According to another aspect of the embodiments of the present invention, a method for identifying the social relations of users is also disclosed. The method comprises: collecting the Wi-Fi connection information of terminal devices used by the users within a predetermined scene period, wherein the predetermined scene period corresponds to a predetermined scene; identifying a scene Wi-Fi corresponding to each terminal device in the predetermined scene according to the Wi-Fi connection information; and determining that the users using the terminal devices corresponding to the same scene Wi-Fi have a first-level contact relation.

Preferably, the predetermined scene may comprise a working scene and/or a home scene; the predetermined scene period may comprise a working period and/or a home period; the working period is a set period in the working time of working days; and the home period is a set period of every night.

Preferably, the step of identifying the scene Wi-Fi corresponding to each terminal device in the predetermined scene according to the Wi-Fi connection information may comprise: counting the connection frequency of each Wi-Fi connected by the terminal device used by each user within the predetermined scene period, and taking the Wi-Fi with the highest connection frequency as the scene Wi-Fi corresponding to the terminal device in the predetermined scene.

Preferably, it is determined that the terminal device does not have a corresponding scene Wi-Fi in the predetermined scene if the connection frequency of the Wi-Fi with the highest connection frequency is smaller than a predetermined scene frequency threshold.

Preferably, the step of determining that the users corresponding to the same scene Wi-Fi have a first-level contact relation may comprise: establishing a scene relation matrix $M_k$ corresponding to each predetermined scene, wherein if the $i^{th}$ user and the $j^{th}$ user correspond to the same scene Wi-Fi in the $k^{th}$ predetermined scene, the elements in $j^{th}$ column of the $i^{th}$ row as well as in $i^{th}$ column of the $j^{th}$ row of $M_k$ are set to be "1", otherwise "0", and i, j and k are natural numbers; adding scene relation matrices $M_k$ corresponding to all the predetermined scenes to obtain a fusion relation matrix R; assigning "1" to all non-zero elements in the fusion relation matrix R to obtain a first-level contact relation matrix T, wherein if the element in $j^{th}$ column of the $i^{th}$ row is "1", it is indicated that there is a first-level contact relation between the $i^{th}$ user and the $j^{th}$ user, and if the element in $j^{th}$ column of the $i^{th}$ row is "0", it is indicated that there is no first-level contact relation between the $i^{th}$ user and the $j^{th}$ user.

Preferably, the method may further comprise: squaring the first-level contact relation matrix T to obtain a squaring matrix T×T; assigning "1" to all non-zero elements in the squaring matrix to obtain a composite relation matrix U; and subtracting the first-level contact relation matrix T from the composite relation matrix U to obtain a second-level contact relation matrix V, wherein if the element in $j^{th}$ column of the $i^{th}$ row is "1", it is indicated that there is a second-level contact relation between the $i^{th}$ user and the $j^{th}$ user, and if the element in $j^{th}$ column of the $i^{th}$ row is "0", it is indicated that there is no second-level contact relation between the $i^{th}$ user and the $j^{th}$ user.

According to still another aspect of the embodiments of the present invention, a terminal device is further disclosed. The terminal device comprises: a memory; a processor; and a device for identifying the social relations of users, wherein the device for identifying the social relations of the users is installed in the memory and comprises one or more software function modules executable by the processor, and the device for identifying the social relations of the users comprises: a Wi-Fi connection information collecting unit, configured to collect the Wi-Fi connection information of terminal devices used by the users within a predetermined scene period, wherein the predetermined scene period corresponding to a predetermined scene; a scene Wi-Fi identifying unit, configured to identify a scene Wi-Fi corresponding to each terminal device in the predetermined scene according to the Wi-Fi connection information; and a first-level contact relation determining unit, configured to determine that the users using the terminal devices corresponding to the same scene Wi-Fi have a first-level contact relation.

To sum up, the device and the method for identifying the social relations of the users according to the embodiments of the present invention can establish the social relations (first-level contact relation) among the users based on the collected Wi-Fi connection information of the terminal devices used by the users, thereby solving the problem that in an existing technology for identifying the social relations of the users, because of the relatively single source of social data, the social relations of the users cannot be accurately obtained in the absence of the social data.

BRIEF DESCRIPTION OF THE DRAWINGS

The above and other objects, features and advantages of the present disclosure will become more apparent by describing exemplary embodiments thereof in detail with reference to the accompanying drawings, and in the exemplary embodiments of the present disclosure, the same reference numbers generally represent the same parts.

DETAILED DESCRIPTION

Figure 1:
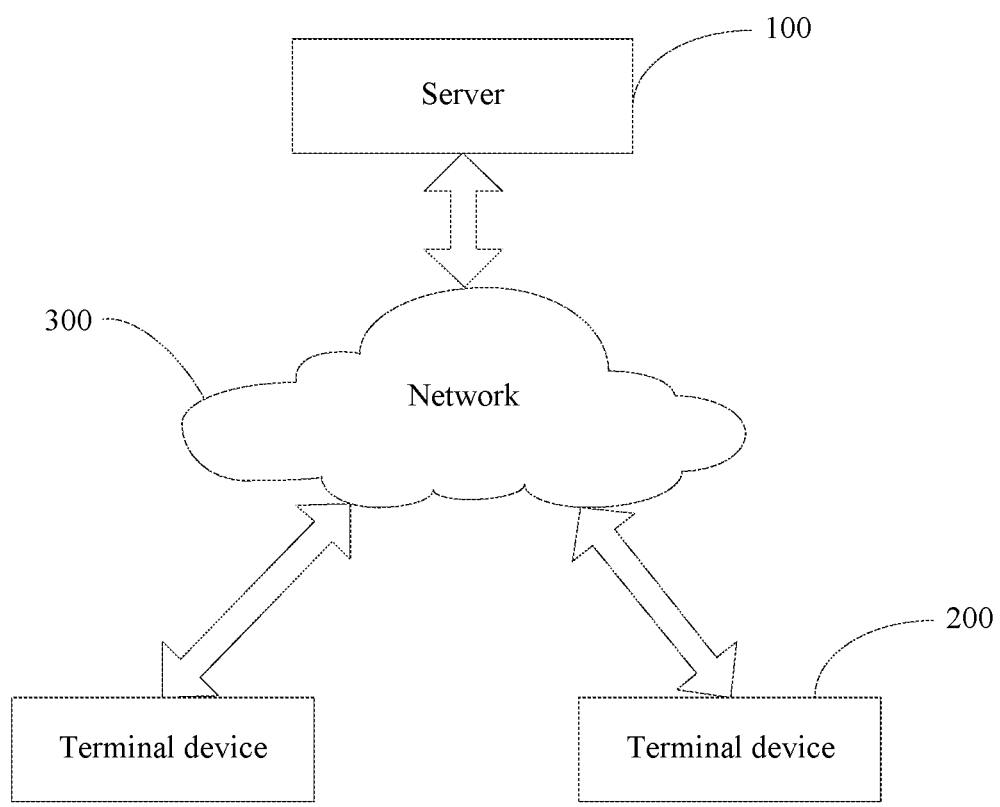
FIG. 1 shows an application environment schematic diagram of a device and a method for identifying the social relations of users according to an embodiment of the present invention.

As shown in FIG. 1, it is an interaction schematic diagram of communication between a server 100 and terminal devices 200 provided by a preferred embodiment of the present invention. The server 100 may communicate with one or more terminal devices 200 through a network 300, so as to realize data communication or interaction between the server 100 and the terminal devices 200.

In this embodiment, the server 100 may be, but not limited to, a web server, a file transfer protocol (ftp) server and the like. The terminal device 200 may be, but not limited to, a smart phone, a personal computer (PC), a tablet computer, a personal digital assistant (PDA), a mobile Internet device (MID) and the like. The network 300 may be, but not limited to, a wired network or a wireless network, and the wireless network may be Wi-Fi. An operating system of the terminal device 200 may be, but not limited to, an Android system, an iPhone operating system (IOS), a Windows phone system, a Windows system and the like. Preferably, in this embodiment, the operating system of the terminal device 200 is an IOS.

Figure 2:
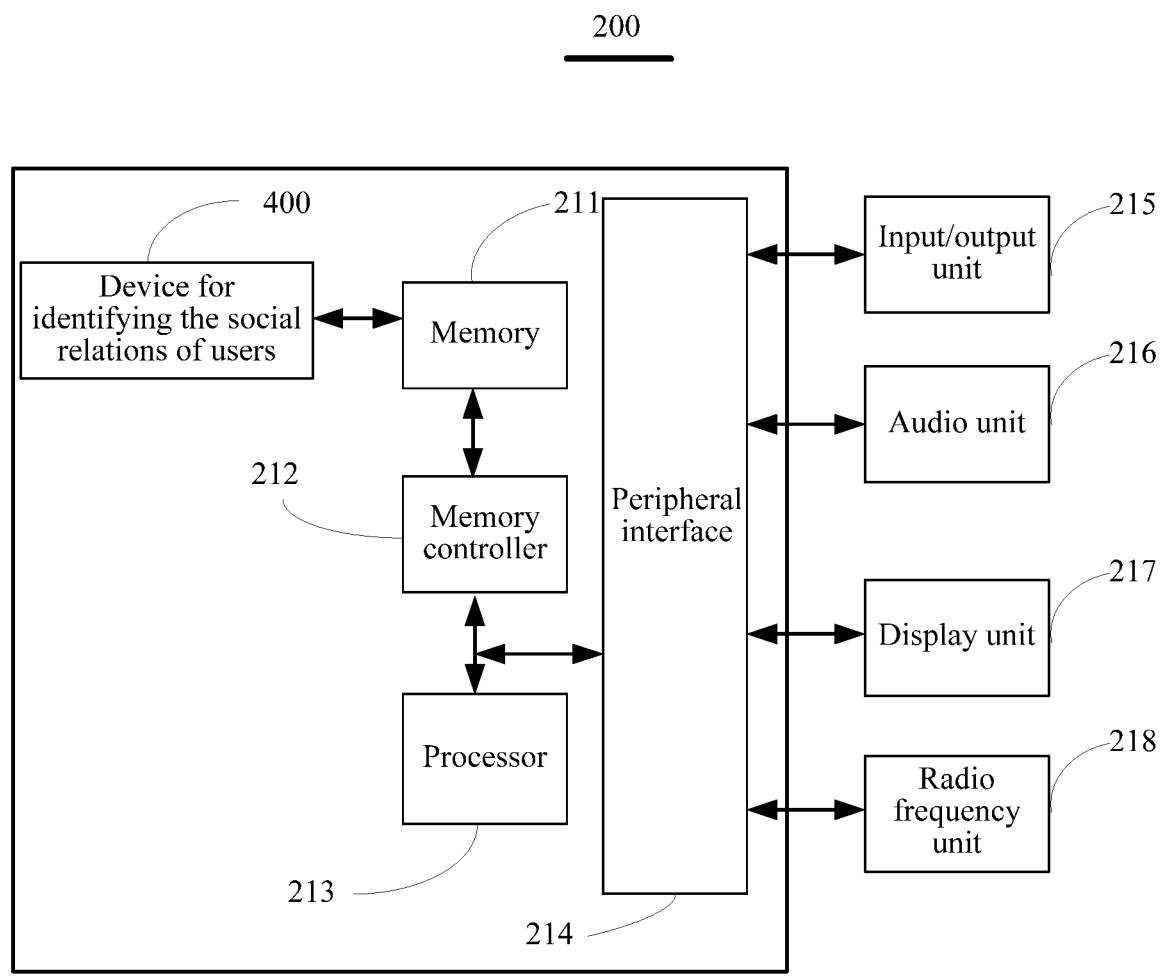
FIG. 2 shows a block diagram of a terminal device according to the embodiment of the present invention.

As shown in FIG. 2, it is a block diagram of the terminal device 200 shown in FIG. 1. The terminal device 200 comprises a device for identifying the social relations of users 400, a memory 211, a memory controller 212, a processor 213, a peripheral interface 214, an input/output unit 215, an audio unit 216, a display unit 217 and a radio frequency unit 218.

The memory 211, the memory controller 212, the processor 213, the peripheral interface 214, the input/output unit 215, the audio unit 216, the display unit 217 and the radio frequency unit 218 are directly or indirectly electrically connected with each other to realize data transfer or interaction. For example, the elements may be electrically connected with each other by one or more communication buses or signal lines. The device for identifying the social relations of the users 400 comprises at least one software function module which can be stored in the memory 211 in the form of software or firmware or solidified in the operating system (OS) of the terminal device 200. The memory 211 stores application programs which is downloaded and installed by the terminal device 200 from the server 100. The processor 213 is configured to execute an executable module stored in the memory 211, for example, the software function modules and computer programs included in the device for identifying the social relations of the users 400.

The memory 211 may be, but not limited to, a random access memory (RAM), a read only memory (ROM), a programmable read-only memory (PROM), an erasable programmable read-only memory (EPROM), an electric erasable programmable read-only memory (EEPROM), and the like. The memory 211 is configured to store a program, and the processor 213 executes the program after receiving an execution instruction. Access by the processor 213 and other possible components to the memory 211 may be performed under the control of the memory controller 212.

The processor 213 may be an integrated circuit chip with signal processing capability. The processor may be a general-purpose processor, comprising a central processing unit (CPU), a network processor (NP), and the like. The processor may also be a digital signal processor (DSP), an application specific integrated circuit (ASIC), a field programmable gate array (FPGA) or other programmable logic devices, discrete gates or transistor logic devices and discrete hardware components. The disclosed methods, steps and logic block diagrams in the embodiments of the present invention may be realized or implemented. The general-purpose processor may be a microprocessor or the processor may also be any conventional processor and the like.

The peripheral interface 214 couples various input/output devices, such as the input/output unit 215, the audio unit 216, the display unit 217 and the radio frequency unit 218, to the processor 213 and the memory 211. In some embodiments, the peripheral interface 214, the processor 213, and the memory controller 212 may be realized in a single chip. In other embodiments, they may each be realized by a separate chip.

The input/output unit 215 is configured to provide input data to a user to realize interaction between the user and the terminal device 200. The input/output unit 215 may be, but not limited to, a mouse, a keyboard and the like.

The audio unit 216 provides the user with an audio interface which may include one or more microphones, one or more speakers, and an audio circuit.

The display unit 217 provides an interactive interface (such as a user operation interface) between the terminal device 200 and the user or is configured to display image data. In this embodiment, the display unit 217 may be a liquid crystal display or a touch display. In the case of a touch display, it can be a capacitive touch screen or a resistive touch screen which supports single-touch and multi-touch operation. The support of single-touch and multi-touch operation refers to that the touch display can sense touch operation generated at one or more locations on the touch display, and the sensed touch operation is calculated and processed by the processor.

The radio frequency unit 218 is configured to receive and transmit radio wave signals (such as electromagnetic waves), and realize mutual conversion of radio waves and electrical signals, so as to realize wireless communication between the terminal device 200 and the network 300 or other communication devices.

Hereinafter, preferred embodiments of the present disclosure will be described in more detail with reference to the accompanying drawings. Although the drawings illustrate the preferred embodiments of the present disclosure, it should be understood that the disclosure may be implemented in various forms and should not be limited to the embodiments set forth herein. Rather, these embodiments are provided to make the present disclosure thorough and complete, and will fully convey the scope of the present disclosure to those skilled in the art.

As mentioned above, in existing technology for identifying the social relations of users, because of the relatively single source of social data, the social relations of the users cannot be accurately obtained in the absence of the social data. The present invention provides a solution for mining the social relations of the users through non-social data. Specifically, the social relations among the users can be established based on collected Wi-Fi connection information of terminal devices used by the users, the first-level contact relations among the users are mined, and based on the first-level contact relations, possible second-level contact relations can be further mined, wherein the first-level contact relations refer to direct social relations among the users, and the second-level contact relations refer to indirect social relations among the users.

The terminal devices used by the users may be a mobile terminal such as a mobile phone, an IPAD, a notebook, or the like. The process of collecting the Wi-Fi connection information of the terminal devices used by the users may be as follows.

It is possible to monitor whether a target event occurs on the terminal device 200 (that is, monitor whether the terminal device 200 is connected to Wi-Fi) or not. Here, a monitoring period may be set, for example, a working period and an evening rest period may be set. During the set period, whether the terminal device 200 is connected to Wi-Fi or not is monitored.

If it is detected that the terminal device 200 is connected to Wi-Fi within the set period, sampling can be conducted for multiple times at a certain frequency (for example, sampling every other 20 minutes for a total of 10 times). In the sampling process, certain log points may be recorded to store a unique identifier of the current device, a unique identifier of a Wi-Fi connected by the current device, the current sampling time and so on. The recorded log can then be sent to a server 100 at the right time. For example, when the terminal device 200 is connected to Wi-Fi, the log can be uploaded to the server 100 over Wi-Fi within the preset period.

Those skilled in the art may also have other ways for obtaining the Wi-Fi connection information of the users, and details are not described herein again.

The above-mentioned solution for identifying the social relations of the users based on the Wi-Fi connection information of the users according to the embodiment of the present invention may be implemented as a device and a method for identifying the social relations of the users. The device and the method for identifying the social relations of the users according to the embodiment of the present invention will be described below with reference to the accompanying drawings.

Figure 3:
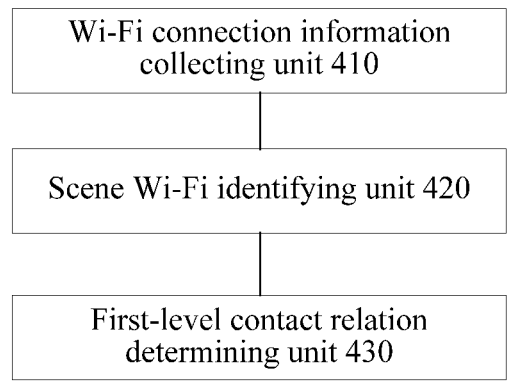
FIG. 3 shows a schematic block diagram of the structure of the device for identifying the social relations of users according to the embodiment of the present invention.

FIG. 3 shows a schematic block diagram of the structure of the device 400 for identifying the social relations of users according to an embodiment of the present invention.

Figure 4:
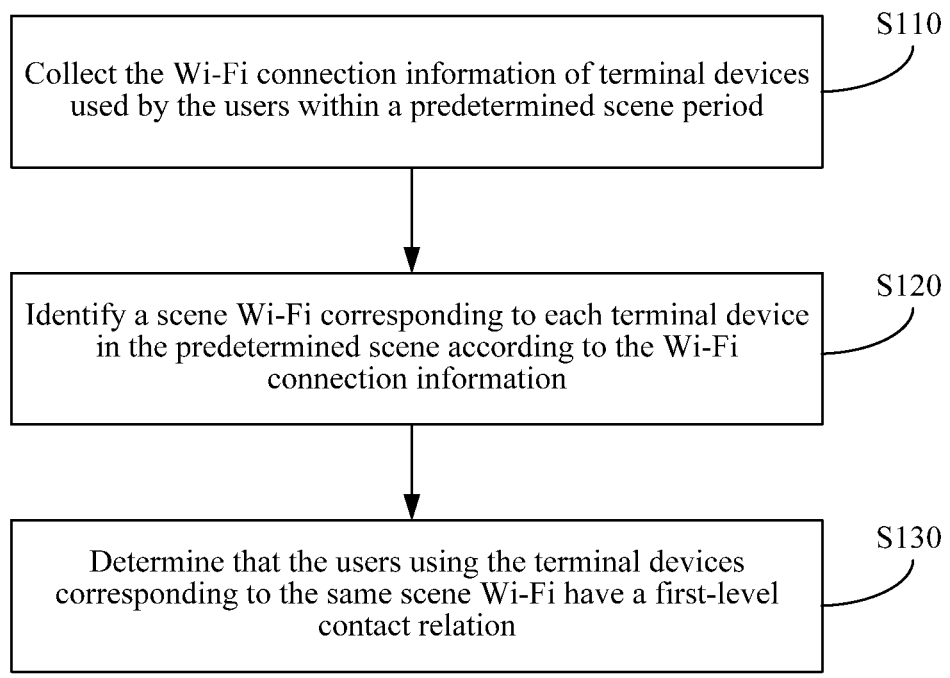
FIG. 4 shows a schematic flowchart of the method for identifying the social relations of users according to the embodiment of the present invention.

FIG. 4 shows a schematic flowchart of the method for identifying the social relations of users according to the embodiment of the present invention.

As shown in FIG. 3, the device 400 for identifying the social relations of the users according to the embodiment of the present invention comprises a Wi-Fi connection information collecting unit 410, a scene Wi-Fi identifying unit 420, and a first-level contact relation determining unit 430.

As shown in FIG. 4, at step S110, for example, the Wi-Fi connection information collecting unit 410 may be used for collecting the Wi-Fi connection information of the terminal devices 200 used by the users within a predetermined scene period, wherein the predetermined scene period corresponds to a predetermined scene.

The terminal devices 200 mentioned here refer to hardware devices which can be connected to a network through Wi-Fi, for example, a mobile terminal such as a mobile phone, an IPAD, a notebook or the like.

The Wi-Fi connection information may include a user ID (unique identifier) and/or a unique identifier of the terminal device, a Wi-Fi unique identifier of the connected Wi-Fi, a sampling time, and the like.

According to the corresponding predetermined scene, the predetermined scene period may be a certain period within a day, a day or a few days (a few days may be continuous or discontinuous), or may be a fixed period in each of a few days. For example, when the predetermined scene is a working scene, the corresponding predetermined scene period may be a working period within working days of each week, that is, a working period from Monday to Friday of each week.

That is to say, the predetermined scene period may be set according to the actual situation. For example, the users may be divided into different categories according to a certain division criterion, and different predetermined scene periods and corresponding predetermined scenes may be set for different categories.

For example, the users may be classified as office workers and students according to their age. For office workers, the predetermined scene period can be set as a working period (from 9:00 a.m. to 12:00 noon and from 14:00 p.m. to 18:00 p.m., corresponding to a working scene) in working days (Monday to Friday of each week), a home period (from 22:00 p.m. to 8:00 a.m., corresponding to a home scene), and an outdoor entertainment period (from 19:00 p.m. to 21:00 p.m. late night, corresponding to an outdoor entertainment scene). For students, the predetermined scene period may be set as a class period (from 9:00 a.m. to 12:00 noon and from 14:00 p.m. to 17:00 p.m., corresponding to a classroom scene), an extracurricular period (from 18:00 p.m. to 20:00 p.m., corresponding to an extracurricular scene), and a dormitory period (from 22:00 p.m. to 8:00 a.m., corresponding to a dormitory scene).

In step S120, for example, the scene Wi-Fi identifying unit 420 may identify a scene Wi-Fi corresponding to each terminal device 200 in the predetermined scene according to the Wi-Fi connection information.

That is, the Wi-Fi to which the terminal device 200 is connected in the predetermined scene may be identified as the scene Wi-Fi corresponding to the predetermined scene according to the obtained Wi-Fi connection information of the terminal device 200 used by the user.

In step S130, for example, the first-level contact relation determining unit 430 may determine that the users using the terminal devices 200 corresponding to the same scene Wi-Fi have a first-level contact relation.

For the terminal devices 200 which are connected to the same Wi-Fi in the same predetermined scene, it can be determined that the users corresponding to the terminal devices 200 may have a first-level contact relation (that is, they have a direct contact relation).

For example, the predetermined scene may comprise a working scene and/or a home scene; correspondingly, the predetermined scene period may comprise a working period and/or a home period, wherein the working period is a set period in the working time of working days, and the home period is a set period of every night. Therefore, the first-level contact relation among users whose terminal devices 200 are connected to the same Wi-Fi during the working period is a co-worker relation/working partnership, and the first-level contact relation among users whose terminal devices 200 are connected to the same Wi-Fi during the home period is family member relation.

The process of identifying the scene Wi-Fi will be described in detail below with reference to FIG. 5 and FIG. 6.

Figure 5:
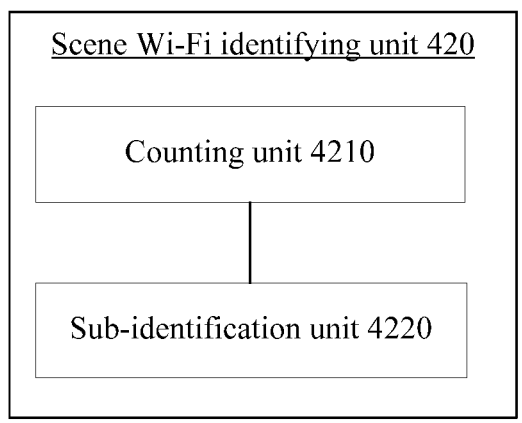
FIG. 5 schematically shows an embodiment of a scene Wi-Fi identifying unit.

FIG. 5 schematically shows an embodiment of the scene Wi-Fi identifying unit 420.

Figure 6:
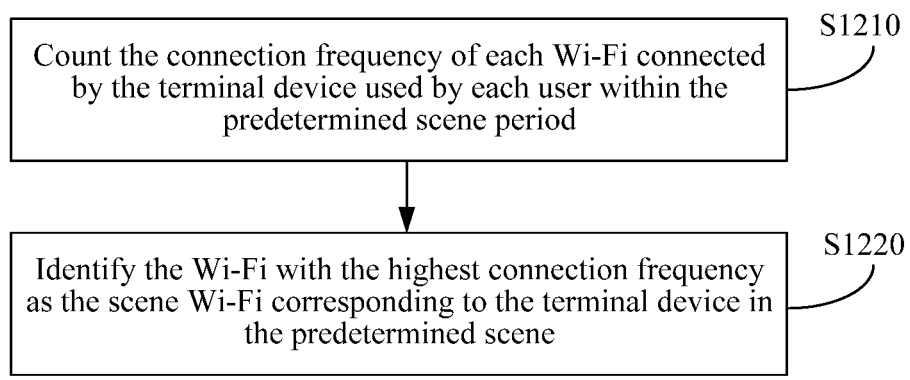
FIG. 6 schematically shows an implementation manner of step S120.

FIG. 6 schematically shows an implementation manner of step S120.

As shown in FIG. 5, the scene Wi-Fi identifying unit 420 may comprise a counting unit 4210 and a sub-identification unit 4220.

As shown in FIG. 6, in step S1210, for example, the counting unit 4210 may count the connection frequency of each Wi-Fi connected by the terminal device 200 used by each user within the predetermined scene period.

For example, the number of times of connection or the number of times of connection sampling in a predetermined scene period may be counted, and the number of times of connection or the number of times of connection sampling in a plurality of predetermined scene periods may also be counted.

Specifically, when the predetermined scene period is a certain period within a day, the number of times of connection or the number of times of connection sampling in a predetermined scene period within one day or continuous multiple days may be counted.

When the predetermined scene is a working scene, the number of times of connection or the number of times of connection sampling in a predetermined scene period in one or more consecutive working days may be counted. When the predetermined scene is a home scene, the number of times of connection or the number of times of connection sampling in a predetermined scene period within one or more natural days may be counted.

On the other hand, in a case where the predetermined scene period is one day or consecutive days, for example, five working days of a week or two rest days of a week, the number of times of connection or the number of times of connection sampling in one or more predetermined scene periods (for example, one week or multiple weeks) may be counted.

In step S1220, for example, the sub-identification unit 4220 may identify the Wi-Fi with the highest connection frequency as the scene Wi-Fi corresponding to the terminal device 200 in the predetermined scene.

For a specific predetermined scene, scene Wi-Fis of terminal devices 200 used by multiple users in the scene may be acquired and formed into a Wi-Fi unique identifier set in the scene, wherein a unique identifier of each terminal device 200 and a Wi-Fi unique identifier corresponding to the unique identifier of each terminal device 200 may be stored in the set. In this way, the users corresponding to the terminal devices 200 which belong to the same Wi-Fi identifier set and are connected to the same Wi-Fi in the same scene have a first-level contact relation in this scene.

For example, when the predetermined scene is a working scene, working Wi-Fis of terminal devices 200 used by multiple users in the working scene may be acquired, and the acquired working Wi-Fis of a plurality of terminal devices 200 form a working Wi-Fi unique identifier set. When the predetermined scene is a home scene, home Wi-Fis of terminal devices 200 used by multiple users in the home scene may be acquired, and the acquired home Wi-Fis of a plurality of terminal devices 200 form a home Wi-Fi unique identifier set. The users corresponding to the terminal devices 200 which belong to the working Wi-Fi unique identifier set and are connected to the same working Wi-Fi have a co-worker relation/working partnership, and the users corresponding to the terminal devices 200 which belong to the same home Wi-Fi unique identifier set and are connected to the same home Wi-Fi have a family member relation.

In addition, the sub-identification unit 4220 determines that the terminal device 200 does not have a corresponding scene Wi-Fi in the predetermined scene if the connection frequency of the Wi-Fi with the highest connection frequency is smaller than a predetermined scene frequency threshold.

The first-level contact relation identifying process will be described in detail with reference to FIG. 7 and FIG. 8.

Figure 7:
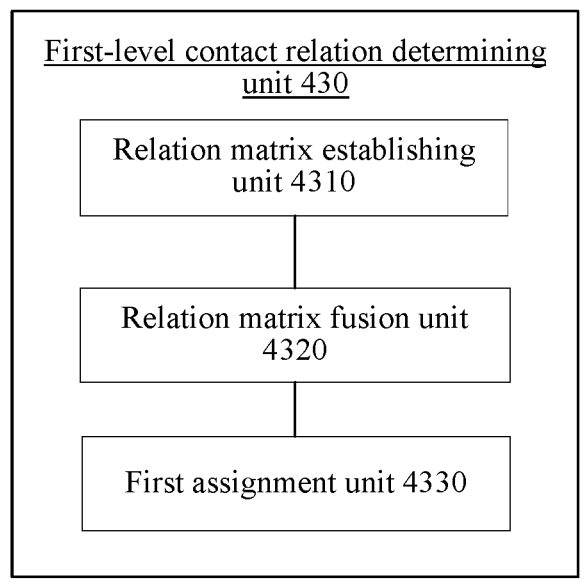
FIG. 7 schematically shows an embodiment of a first-level contact relation determining unit.

FIG. 7 schematically shows an embodiment of the first-level contact relation determining unit 430.

Figure 8:
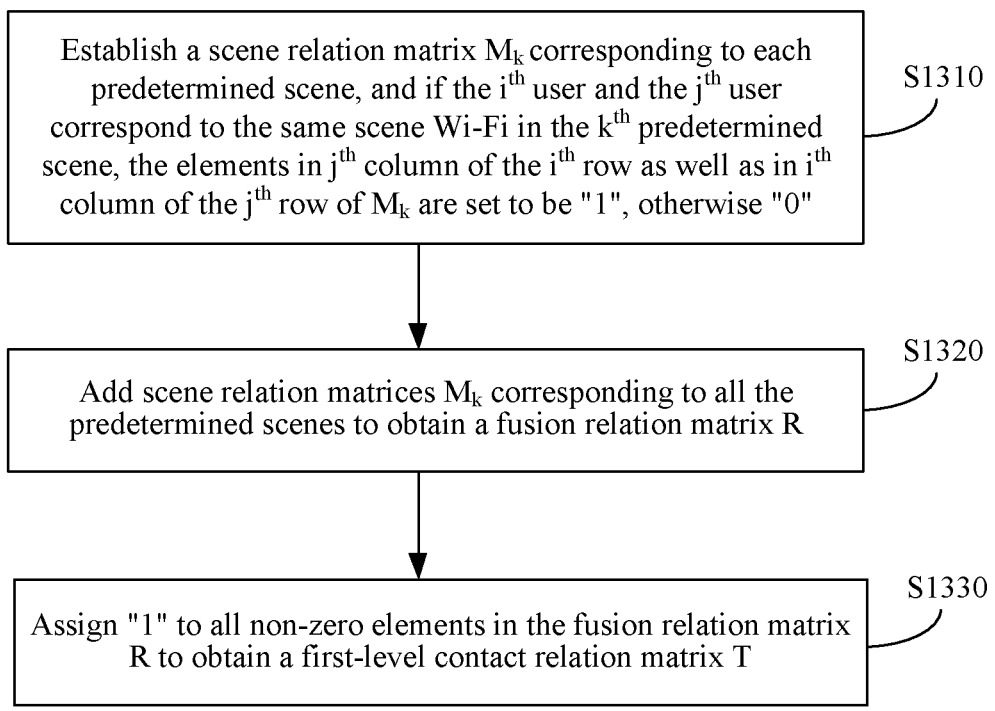
FIG. 8 schematically shows an implementation manner of step S130.

FIG. 8 schematically shows an implementation manner of step S130.

As shown in FIG. 7, the first-level contact relation determining unit 430 may comprise a relation matrix establishing unit 4310, a relation matrix fusion unit 4320, and a first assignment unit 4330.

As shown in FIG. 8, in step S1310, for example, the relation matrix establishing unit 4310 may establish a scene relation matrix $M_k$ corresponding to each predetermined scene, and if the $i^{th}$ user and the $j^{th}$ user correspond to the same scene Wi-Fi in the $k^{th}$ predetermined scene, the elements in $j^{th}$ column of the $i^{th}$ row as well as in i column of the $j^{th}$ row of $M_k$ are set to be "1", otherwise "0", wherein i, j and k are natural numbers.

K represents the type of the predetermined scene, for example, $M_1$ (k=1) can be considered as a working relation matrix, and $M_2$ (k=2) can be considered as a home relation matrix.

In practice, the connection relation between the user and the scene (u, wifi) may be extracted, and a set of user connection relations of scene Wi-Fi may be established.

In step S1320, for example, the relation matrix fusion unit 4320 may add scene relation matrices $M_k$ corresponding to all the predetermined scenes to obtain a fusion relation matrix R.

In step S1330, for example, the first assignment unit 4330 may assign "1" to all non-zero elements in the fusion relation matrix R to obtain a first-level contact relation matrix T, wherein if the element in $j^{th}$ column of the $i^{th}$ row is "1", it is indicated that there is a first-level contact relation between the $i^{th}$ user and the $j^{th}$ user, and if the element in $j^{th}$ column of the $i^{th}$ row is "0", it is indicated that there is no first-level contact relation between the i user and the $j^{th}$ user.

So far, the specific process of identifying the first-level contact relations existing among the users based on the Wi-Fi information connected by the terminal devices 200 used by the users is described in detail with reference to FIG. 1 to FIG. 8. For the present invention, it is also possible to further identify the second-level contact relations among the users based on the identified first-level contact relations.

Next, another embodiment will be described with reference to FIG. 9 and FIG. 10. In this embodiment, the second-level contact relations may be obtained based on the first-level contact relations obtained above.

Figure 9:
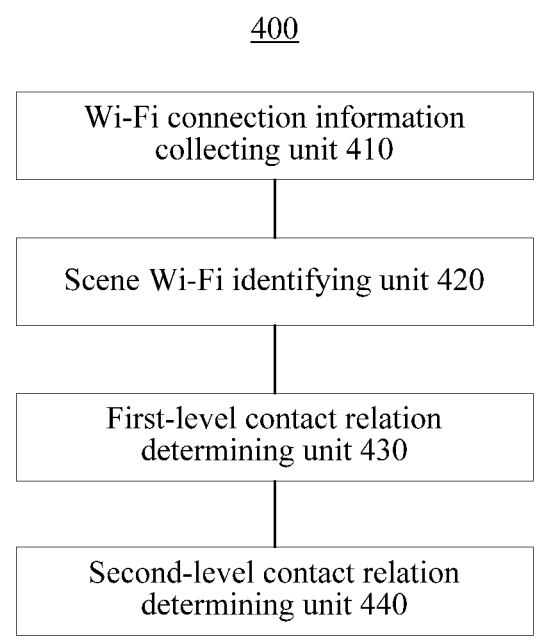
FIG. 9 shows a schematic block diagram of a device for identifying the social relations of users according to another embodiment of the present invention.

FIG. 9 shows a schematic block diagram of a device 400 for identifying the social relations of users according to the embodiment.

Figure 10:
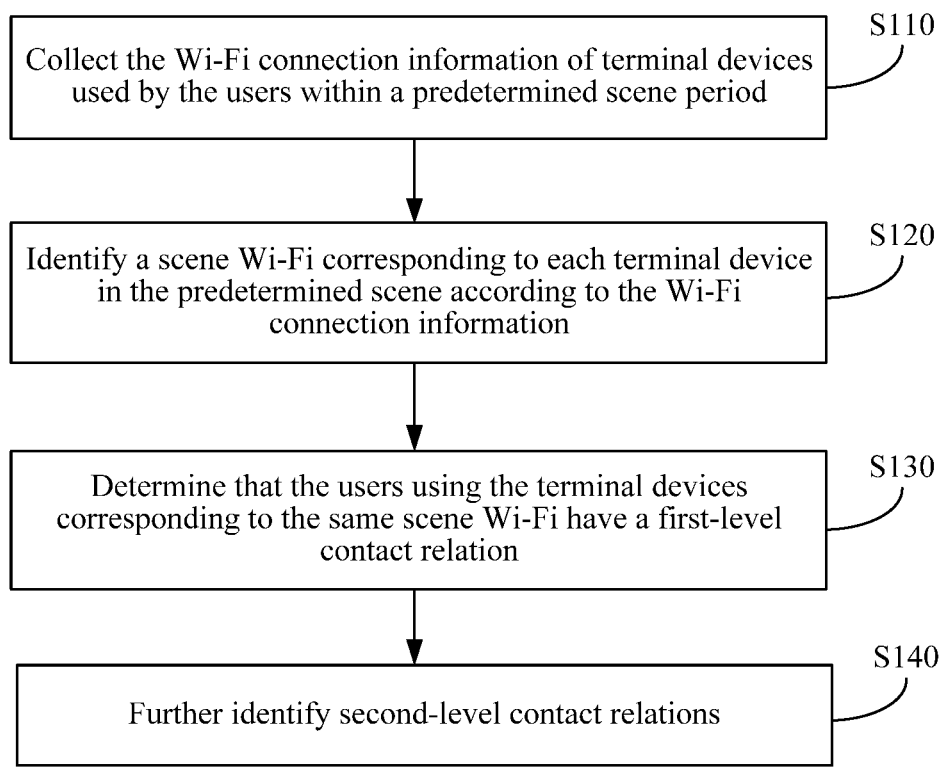
FIG. 10 shows a schematic flowchart of a method for identifying the social relations of users according to another embodiment of the present invention.

FIG. 10 shows a schematic flowchart of a method for identifying the social relations of users according to the embodiment.

In FIG. 9, the Wi-Fi connection information collecting unit 410, the scene Wi-Fi identifying unit 420, and the first-level contact relation determining unit 430 are the same as those described above with reference to FIG. 1.

In FIG. 8, steps S110, S120 and S130 are the same as described above with reference to FIG. 4.

As shown in FIG. 9 and FIG. 10, in step S130, for example, once the first-level contact relation determining unit 430 obtains the first-level contact relation matrix T, in step S140, for example, a second-level contact relation determining unit 440 may further identify the second-level contact relations.

The second-level contact relation identifying process will be described in detail with reference to FIG. 11 and FIG. 12.

Figure 11:
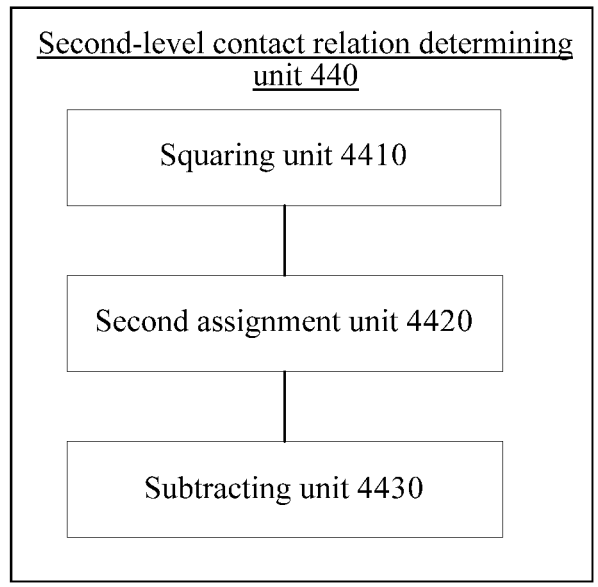
FIG. 11 shows a schematic block diagram of the structure of a second-level contact relation identifying unit.

FIG. 11 shows a schematic block diagram of the structure of the second-level contact relation identifying unit 440.

Figure 12:
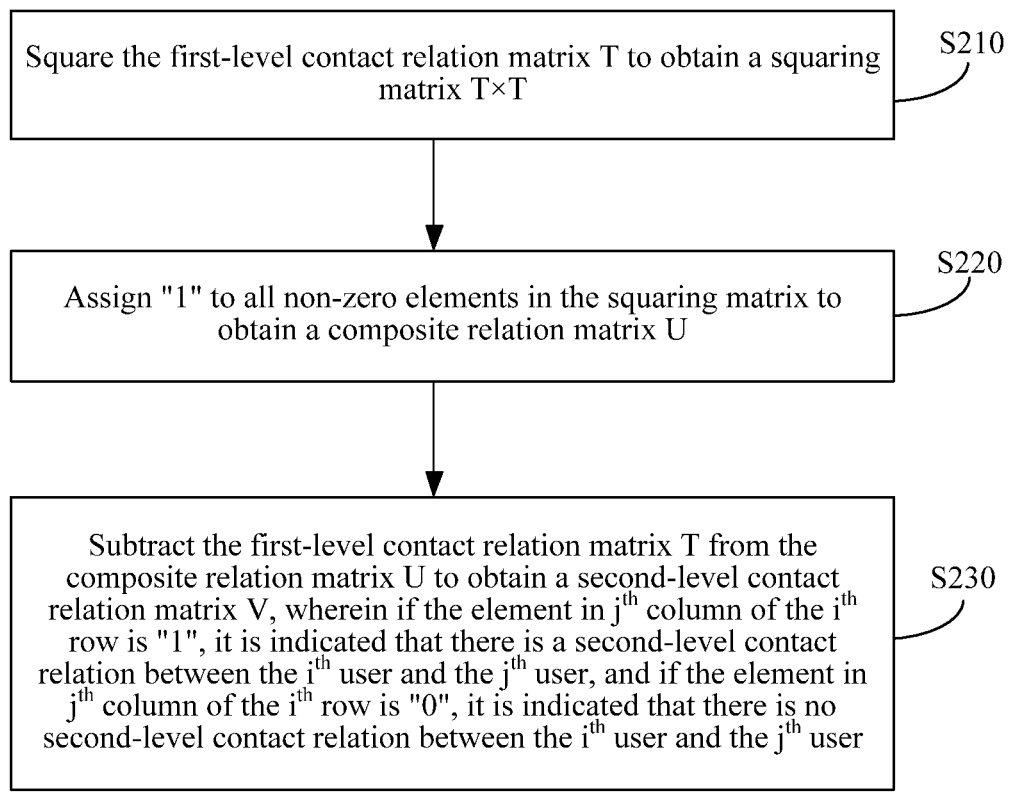
FIG. 12 shows a schematic flow chart of a second-level contact identifying method.

FIG. 12 shows a schematic flow chart of a second-level contact identifying method.

As shown in FIG. 10, the second-level contact relation identifying unit 440 may comprise a squaring unit 4410, a second assignment unit 4420, and a subtracting unit 4430.

As shown in FIG. 12, in step S210, for example, the squaring unit 4410 may square the first-level contact relation matrix T to obtain a squaring matrix T×T.

In step S220, for example, the second assignment unit 4420 may assign "1" to all non-zero elements in the squaring matrix to obtain a composite relation matrix U.

In step S230, for example, the subtracting unit 4430 may subtract the first-level contact relation matrix T from the composite relation matrix U to obtain a second-level contact relation matrix V, wherein if the element in $j^{th}$ column of the $i^{th}$ row is "1", it is indicated that there is a second-level contact relation between the $i^{th}$ user and the $j^{th}$ user, and if the element in $j^{th}$ column of the $i^{th}$ row is "0", it is indicated that there is no second-level contact relation between the $i^{th}$ user and the $j^{th}$ user.

Squaring the Element in $j^{th}$ Column of the $i^{th}$ Row $$(T \times T)_{ij} = \sum_k T_{ik} T_{kj}$$

If a user i and a user k have a first-level contact relation (which may also be referred to simply as "acquaintance"), then $T_{ik}$ is 1, and if a user j and the user k have a first-level contact relation, then $T_{kj}$ is 1, accordingly $T_{ik}T_{kj}$ is 1.

Therefore, $(T \times T)_{ij}$ is the number of users who have a first-level contact relation with both the user i and the user j. $(T \times T)_{ij}$ is assigned a value of 1 in U when greater than 0. By subtracting the first-level matrix T, the relations which have been expressed with the first-level relations (in U, the element corresponding to two users ij having a first-level contact relation is also 1) are removed, and the second-level contact relations are obtained.

The first-level contact relation and second-level contact relation identifying process of the present invention will be described briefly with specific embodiments.

(1) Wifi Connection Relation Collection

Taking the predetermined scene comprising a working scene or a home scene as an example, whether a device is connected to Wi-Fi can be detected at a device terminal 200 (which may be set as a working period and a rest period at night, which respectively correspond to a working scene and a home scene).

If the terminal device 200 is connected to Wi-Fi, sampling can be conducted for multiple times at a certain frequency (for example, sampling every other 20 minutes for a total of 10 times). Preferably, the sampling frequency during the rest period at night can be set to be a lower frequency value.

In the sampling process, log point printing may be conducted to record a unique identifier of the current device, a unique identifier of a Wi-Fi connected by the current terminal device 200, the current sampling time and so on. The recorded log can then be sent to a server 100 at the right time. For example, when the terminal device 100 is connected to Wi-Fi, the log can be uploaded to the server over Wi-Fi within the preset period.

(2) Working Scene Recognition:

Step 1: Counting the number of sampling times $n_{u, t, w}$ that a user connects to a certain wifi during a working period (for example, 10:00 a.m.-11:00 a.m. and 15:00 p.m.-16:00 p.m.) on a certain day, wherein u represents the user, t represents the $t^{th}$ day, and w represents the unique identifier of the connected wifi of the user u during current sampling on the $t^{th}$ day;

Step 2: Calculating the proportion of each wifi to which the user u connects in the selected working period (for example, the last 30 working days):

$$R_{u,w} = \frac{\sum_t n_{u,t,w}}{\sum_t \sum_w n_{u,t,w}}$$

Step 3: If there is a certain wifi unique identifier W, then:

$R_{u,W} = \max_w(R_{u,w}) \geq \alpha$ (wherein $0 < \alpha \leq 1$)

it is considered that the unique identifier of the wifi of the user u in the workplace is work_wifi=W otherwise it is considered that the unique identifier of the wifi of the user u in the workplace is null;

Step 4: Performing Step 1-Step 3 for all users to obtain work_wifi of each user, so as to form a work wifi unique identifier set Work_Wifi_Set={work_wifi}

(3) Home Scene Recognition:

Step 1: Recording the number of sampling times $n_{u, t, w}$ that a user connects to a wifi during a home period (for example, 22:00 p.m.-24:00 p.m.) on a certain day, wherein u represents the user, t represents the $t^{th}$ day, and w represents the unique identifier of the connected wifi of the user u during current sampling on the $t^{th}$ day;

Step 2: Calculating the proportion of each wifi to which the user u connects in the selected recording days (for example, the last 30 days):

$$R_{u,w} = \frac{\sum_t n_{u,t,w}}{\sum_t \sum_w n_{u,t,w}}$$

Step 3: If there is a certain wifi unique identifier W, then: $R_{u,W} = \max_w(R_{u,w}) \geq \beta$ (wherein $0 < \beta \leq 1$ and is a constant), it is considered that the unique identifier of the wifi of the user u in the workplace is hom e_wifi=W;

otherwise it is considered that the unique identifier of the wifi of the user u in the workplace is null, that is hom e_wifi=ϕ.

Step 4: Performing Step 1-Step 3 for all users to obtain hom e_wifi of each user, so as to form a home WiFi unique identifier set Home_Wifi_Set={hom e_wifi}

(4) Social Relation Identification

Step 1: Extracting the connection relations (u, wifi) between the users and the work wifi or the home wifi from sampled data, and establishing a work wifi user connection relation set and a home wifi user connection relation set respectively:

Work_Wifi_Connet_Set={(u,wifi) |wifi∈Work_Wifi_Set}

Home_Wifi_Connet_Set={(u,wifi) |wifi∈Home_Wifi_Set}

Step 2: For the work wifi user connection relation set and the home wifi user connection relation set, establishing interconnection among the users connected to the same WiFi $(u_i, u_{i+j})$, and further establishing a connection matrix among the users, so that a work relation matrix W and a home relation matrix H of the users are established.

Step 3: Further, if the work relation matrix is added to the home relation matrix, the entire social relation matrix S=W+H which merges the work relation with the home relation is obtained.

If an element of a certain relation matrix $a_{i,j}>0$, then there is certain kind of social relation between the user i and the user j.

Figure 13:
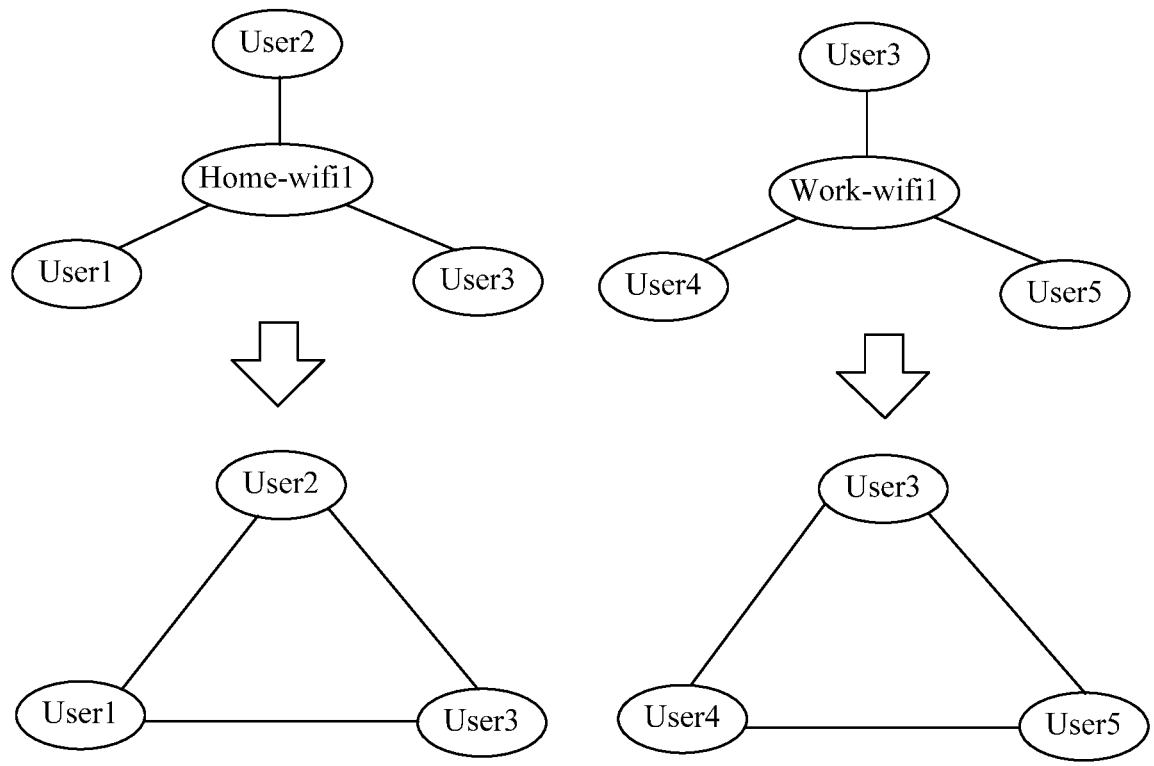
FIG. 13 shows a connection diagram of home relations and working relations existing among users 1 to 5 according to one embodiment.

As shown in FIG. 13, for User 1 to User 5, User 1, User 2 and User 3 correspond to the same home scene Wi-Fi (Home-wifi1), and there is a home relation among them; User 3, User 4 and User 5 correspond to the same working scene Wi-Fi (Work-wifi1), and there is a work relation among them. Based on the home relation among User 1, User 2, and User 3, it can be concluded that there is a first-level contact relation among User 1, User 2, and User 3, and a home relation matrix H among User 1 to User 5 can be established.

Wherein, $$H = \begin{bmatrix} 1 & 1 & 1 & 0 & 0 \\ 1 & 1 & 1 & 0 & 0 \\ 1 & 1 & 1 & 0 & 0 \\ 0 & 0 & 0 & 0 & 0 \\ 0 & 0 & 0 & 0 & 0 \end{bmatrix}$$

Accordingly, based on the work relation existing among the User 3, the User 4, and the User 5, it can be concluded that there is also a first-level contact relation among the User 3, the User 4, and the User 5, and a work relation matrix W among User 1 to User 5 can be established.

$$W = \begin{bmatrix} 0 & 0 & 0 & 0 & 0 \\ 0 & 0 & 0 & 0 & 0 \\ 0 & 0 & 1 & 1 & 1 \\ 0 & 0 & 1 & 1 & 1 \\ 0 & 0 & 1 & 1 & 1 \end{bmatrix}$$

For users 1 to 5, the whole social relation matrix merging the work relation with the home relation is S=W+H. Wherein, $$S = W + H = \begin{bmatrix} 0 & 0 & 0 & 0 & 0 \\ 0 & 0 & 0 & 0 & 0 \\ 0 & 0 & 1 & 1 & 1 \\ 0 & 0 & 1 & 1 & 1 \\ 0 & 0 & 1 & 1 & 1 \end{bmatrix} + \begin{bmatrix} 1 & 1 & 1 & 0 & 0 \\ 1 & 1 & 1 & 0 & 0 \\ 1 & 1 & 1 & 0 & 0 \\ 0 & 0 & 0 & 0 & 0 \\ 0 & 0 & 0 & 0 & 0 \end{bmatrix} = \begin{bmatrix} 1 & 1 & 1 & 0 & 0 \\ 1 & 1 & 1 & 0 & 0 \\ 1 & 1 & 2 & 1 & 1 \\ 0 & 0 & 1 & 1 & 1 \\ 0 & 0 & 1 & 1 & 1 \end{bmatrix}.$$

(5) Second-Level Contact Relation Identification:

If a user A has certain kind of social relation with a user B, the user A has no direct social relation with a user C, but there is certain social relation between the user B and the user C, then there is a second-level contact relation between the user A and the user C.

The discovery and identification of second-level contact relations can be realized by fully utilizing the characteristics of matrix multiplication.

Step 1: Assigning the value 1 to the elements, which is greater than 0, in the relation matrix T to obtain T', and the relation matrix is squared to obtain a new relation matrix S;

Step 2: Assigning the value 1 to the elements, which is greater than 0, in the matrix S to obtain a new matrix S';

Step 3: Subtracting the relation matrix T' from the matrix S' to obtain a second-level contact relation matrix, that is R=S'−T'.

In the second-level contact relation matrix, all elements, which are greater than 0, indicate that there is a second-level contact relation between two users corresponding to the elements.

Figure 14:
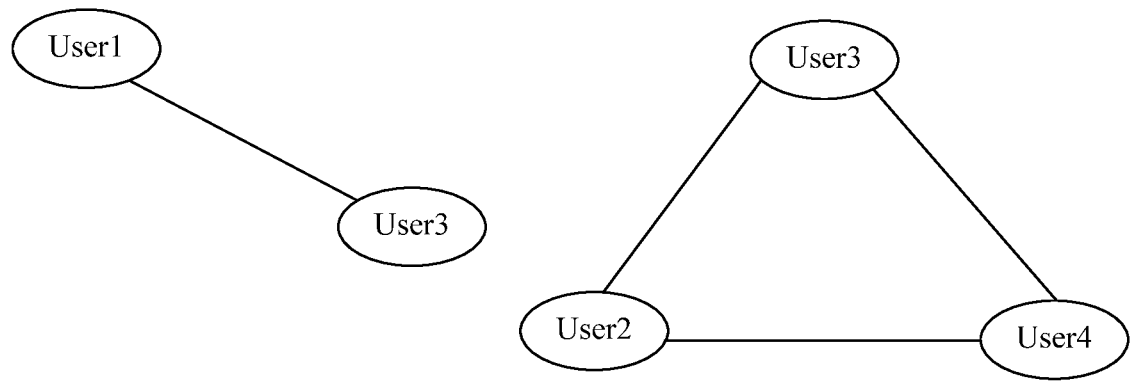
FIG. 14 shows a connection diagram of relations among users 1 to 4 according to another embodiment.

As shown in FIG. 14, there is certain social relation between a user 1 and a user 3, and there are certain social relations among a user 2, the user 3 and a user 4, but there is no direct social relation among the user 1, the user 2 and the user 4.

In this case, the first-level contact relation matrix T between the user 1 and the user 4 can be obtained, wherein $$T = \begin{bmatrix} 1 & 0 & 1 & 0 \\ 0 & 1 & 1 & 1 \\ 1 & 1 & 1 & 1 \\ 0 & 1 & 1 & 1 \end{bmatrix}$$

The squaring matrix T' of the first-level contact relation matrix T is T'=T×T, wherein $$T' = \begin{bmatrix} 2 & 1 & 2 & 1 \\ 1 & 3 & 3 & 3 \\ 2 & 3 & 4 & 3 \\ 1 & 3 & 3 & 3 \end{bmatrix}$$

Assigning "1" to all non-zero elements in the squaring matrix to obtain a composite relation matrix U, wherein $$U = \begin{bmatrix} 1 & 1 & 1 & 1 \\ 1 & 1 & 1 & 1 \\ 1 & 1 & 1 & 1 \\ 1 & 1 & 1 & 1 \end{bmatrix}$$

Subtracting the first-level contact relation matrix T from the composite relation matrix U to obtain a second-level contact relation matrix V, $$V = \begin{bmatrix} 0 & 1 & 0 & 1 \\ 1 & 0 & 0 & 0 \\ 0 & 0 & 0 & 0 \\ 1 & 0 & 0 & 0 \end{bmatrix}$$

Users corresponding to all the elements, which are greater than 0 in V, have a second-level contact relation. Therefore, based on the non-zero elements $a_{12}$ and $a_{14}$ in the second-level contact relation matrix V (namely the elements, in $2^{th}$ and $4^{th}$ columns of the first row, of the second-level contact relation matrix V), it can be determined that user 1 has a second-level contact relation with user 2 and user 4 respectively.

The device and the method for identifying the social relations of the users according to the present invention have been described in detail above with reference to the accompanying drawings.

In addition, the method according to the present invention can also be implemented as a computer program, which comprises computer program code instructions for carrying out the above-described steps as defined in the above method of the present invention. Alternatively, the method according to the present invention may also be implemented as a computer program product, which comprises a computer-readable medium, having non-volatile processor-executable program codes, on which a computer program for performing the above-described functions defined in the above method of the present invention is stored. Those skilled in the art will also appreciate that the various exemplary logical blocks, modules, circuits, and algorithm steps described in combination with the disclosure herein may be implemented as electronic hardware, computer software, or a combination of both.

The flowcharts and block diagrams in the accompanying drawings illustrate possible architecture, functionality, and operation of systems and methods in accordance with various embodiments of the present invention. In this regard, each block of the flowcharts or block diagrams may represent a module, a section of a program, or a portion of a code which includes one or more executable instructions for implementing specified logic functions. It should also be noted that in some alternative implementations, the functions labeled in the blocks may occur out of the order noted in the drawings. For example, two consecutive blocks may in fact be executed substantially in parallel, and sometimes they may be executed in the reverse order, which depending on the function involved. It is also to be noted that each block of the block diagrams and/or flowcharts, and combinations of blocks in the block diagrams and/or flowcharts, can be implemented by special purpose hardware-based systems which perform specified functions or operations, or may be implemented by using a combination of dedicated hardware and computer instructions.

The various embodiments of the present invention have been described above. The foregoing description is exemplary, not exhaustive, and is not intended to be limited to the disclosed embodiments. Multiple modifications and variations will be apparent to those skilled in the art without departing from the scope and spirit of the illustrated embodiments. The terms used herein were chosen to best explain the principles of the embodiments, the practical application, or improvements on technologies in the marketplace or to enable other ordinary personnel skilled in the art to understand the embodiments disclosed herein.

What is claimed is:

1. A device for identifying the social relations of users, comprising:
    one or more processors configured to:
        collect Wi-Fi connection information of terminal devices associated with the users in respective predetermined scenes;
        determine Wi-Fis corresponding to the respective terminal devices in each of the respective predetermined scenes according to the Wi-Fi connection information;
        establish matrices $M_k$ corresponding to each of the respective predetermined scenes k, wherein values of elements of the matrices indicate whether users corresponding to the respective elements are associated with terminal devices corresponding to common Wi-Fis;
        obtain a fusion matrix by summing the matrices $M_k$; and
        determine which of the users have a first-level contact relation based on the obtained fusion matrix.

2. The device for identifying the social relations of the users according to claim 1, wherein
    a predetermined scene of the predetermined scenes comprises a working scene or a home scene.

3. The device for identifying the social relations of the users according to claim 1, wherein the one or more processors are further configured to:
    count a connection frequency of each Wi-Fi connected by a terminal device, of the terminal devices, associated with a user of the users in a predetermined scene of the predetermined scenes; and
    identify a Wi-Fi with a highest connection frequency as a Wi-Fi corresponding to the terminal device in the predetermined scene.

4. The device for identifying the social relations of the users according to claim 3, wherein the one or more processors are further configured to:
    determine that the terminal device does not have a corresponding Wi-Fi in the predetermined scene if the connection frequency of the Wi-Fi with the highest connection frequency is smaller than a predetermined scene frequency threshold.

5. The device for identifying the social relations of the users according to claim 1, wherein the establishing comprises:
    in response to an $i^{th}$ user and a $j^{th}$ user being associated with terminal devices corresponding to common Wi-Fis, setting a first element in an $i^{th}$ column of a $j^{th}$ row and a second element in a $j^{th}$ column of an $i^{th}$ row of the matrices $M_k$ to be "1" while setting other elements to be "0".

6. The device for identifying the social relations of the users according to claim 5, wherein the one or more processors are further configured to:
    obtain a first-level contact relation matrix T by assigning "1" to all non-zero elements in the fusion matrix;
    square the first-level contact relation matrix T to obtain a squaring matrix T×T;
    assign "1" to all non-zero elements in the squaring matrix to obtain a composite relation matrix U;
    subtract the first-level contact relation matrix T from the composite relation matrix U to obtain a second-level contact relation matrix V;
    determine an existence of a second-level contact relation between the $i^{th}$ user and the $j^{th}$ user in response to an element in a $j^{th}$ column of an $i^{th}$ row of the second-level contact relation matrix V being "1"; and
    determine no second-level contact relation exists between the $i^{th}$ user and the $j^{th}$ user in response to the element in the $j^{th}$ column of the $i^{th}$ row of the second-level contact relation matrix V being "0".

7. A method for identifying the social relations of users, comprising:
    collecting Wi-Fi connection information of terminal devices associated with the users in respective predetermined scenes;
    determining Wi-Fis corresponding to the respective terminal devices in each of the respective predetermined scenes according to the Wi-Fi connection information;
    establishing matrices $M_k$ corresponding to each of the respective predetermined scenes k, wherein values of elements of the matrices indicate whether users corresponding to the respective elements are associated with terminal devices corresponding to common Wi-Fis;

obtaining a fusion matrix by summing the matrices $M_k$; and determining which of the users have a first-level contact relation based on the obtained fusion matrix.

8. The method for identifying the social relations of the users according to claim 7, wherein
a predetermined scene of the predetermined scenes comprises a working scene or a home scene.

9. The method for identifying the social relations of the users according to claim 7, wherein the step of determining Wi-Fis corresponding to the respective terminal devices in each of the respective predetermined scenes according to the Wi-Fi connection information comprises:
counting a connection frequency of each Wi-Fi connected by a terminal device, of the terminal devices, associated with a user of the users in a predetermined scene of the predetermined scenes; and
identifying a Wi-Fi with a highest connection frequency as a Wi-Fi corresponding to the terminal device in the predetermined scene.

10. The method for identifying the social relations of the users according to claim 9, further comprising:
determining that the terminal device does not have a corresponding Wi-Fi in the predetermined scene if the connection frequency of the Wi-Fi with the highest connection frequency is smaller than a predetermined scene frequency threshold.

11. The method for identifying the social relations of the users according to claim 7, wherein the establishing comprises:
in response to an $i^{th}$ user and a $j^{th}$ user being associated with terminal devices corresponding to common Wi-Fis, setting a first element in an $i^{th}$ column of a $j^{th}$ row and a second element in a $j^{th}$ column of an $i^{th}$ row of the matrices $M_k$ to be "1" while setting other elements to be "0".

12. The method for identifying the social relations of the users according to claim 11, further comprising:
obtaining a first-level contact relation matrix T by assigning "1" to all non-zero elements in the fusion matrix;
squaring the first-level contact relation matrix T to obtain a squaring matrix T×T;
assigning "1" to all non-zero elements in the squaring matrix to obtain a composite relation matrix U;
subtracting the first-level contact relation matrix T from the composite relation matrix U to obtain a second-level contact relation matrix V;
determining an existence of a second-level contact relation between the $i^{th}$ user and the $j^{th}$ user in response to an element in $j^{th}$ column of an $i^{th}$ row of the second-level contact relation matrix V being "1"; and
determining no second-level contact relation exists between the $i^{th}$ user and the $j^{th}$ user in response to the element in the $j^{th}$ column of the $i^{th}$ row of the second-level contact relation matrix V being "0".

13. A terminal device, comprising:
a memory;
one or more processors processor; and
instructions for identifying the social relations of users, wherein the instructions are stored in the memory and are executed by the one or more processors to perform:
collecting Wi-Fi connection information of terminal devices associated with the users in respective predetermined scenes;

determining Wi-Fis corresponding to the respective terminal devices in each of the respective predetermined scenes according to the Wi-Fi connection information;
establishing matrices $M_k$ corresponding to each of the respective predetermined scenes k, wherein values of elements of the matrices indicate whether users corresponding to the respective elements are associated with terminal devices corresponding to common Wi-Fis;
obtaining a fusion matrix by summing the matrices $M_k$; and
determining which of the users have a first-level contact relation based on the obtained fusion matrix.

14. The terminal device according to claim 13, wherein a predetermined scene of the predetermined scenes comprises a working scene or a home scene.

15. The terminal device according to claim 13, wherein the one or more processors are further configured to:
count a connection frequency of each Wi-Fi connected by a terminal device, of the terminal devices, associated with a user of the users in a predetermined scene of the predetermined scenes; and
identify a Wi-Fi with a highest connection frequency as a Wi-Fi corresponding to the terminal device in the predetermined scene.

16. The terminal device according to claim 15, wherein the one or more processors are further configured to:
determine that the terminal device does not have a corresponding Wi-Fi in the predetermined scene if the connection frequency of the Wi-Fi with the highest connection frequency is smaller than a predetermined scene frequency threshold.

17. The terminal device according to claim 13, wherein the establishing comprises:
in response to an $i^{th}$ user and a $j^{th}$ user being associated with terminal devices corresponding to common Wi-Fis, setting a first element in an $i^{th}$ column of a $j^{th}$ row and a second element in a $j^{th}$ column of an $i^{th}$ row of the matrices $M_k$ to be "1" while setting other elements to be "0".

18. The terminal device according to claim 17, wherein the one or more processors are further configured to:
obtain a first-level contact relation matrix T by assigning "1" to all non-zero elements in the fusion matrix;
square the first-level contact relation matrix T to obtain a squaring matrix T×T;
assign "1" to all non-zero elements in the squaring matrix to obtain a composite relation matrix U; and
subtract the first-level contact relation matrix T from the composite relation matrix U to obtain a second-level contact relation matrix V;
determine an existence of a second-level contact relation between the $i^{th}$ user and the $j^{th}$ user in response to an element in a $j^{th}$ column of an $i^{th}$ row of the second-level contact relation matrix V being "1"; and
determine no second-level contact relation exists between the $i^{th}$ user and the $j^{th}$ user in response to the element in the $j^{th}$ column of the $i^{th}$ row of the second-level contact relation matrix V being "0".

* * * * *

UNITED STATES PATENT AND TRADEMARK OFFICE
CERTIFICATE OF CORRECTION

PATENT NO. : 10,860,595 B2  
APPLICATION NO. : 15/968381  
DATED : December 8, 2020  
INVENTOR(S) : Zhen Huang Page 1 of 1

It is certified that error appears in the above-identified patent and that said Letters Patent is hereby corrected as shown below:

In the Claims

Claim 13, Column 17, Line 58:
"one or more processors processor" should read -- one or more processors --.

Signed and Sealed this
Twenty-seventh Day of June, 2023

Katherine Kelly Vidal
*Director of the United States Patent and Trademark Office*